No. 840,866. PATENTED JAN. 8, 1907.
M. PFATISCHER.
ELECTRICALLY PROPELLED VEHICLE.
APPLICATION FILED NOV. 29, 1905.
2 SHEETS—SHEET 2.
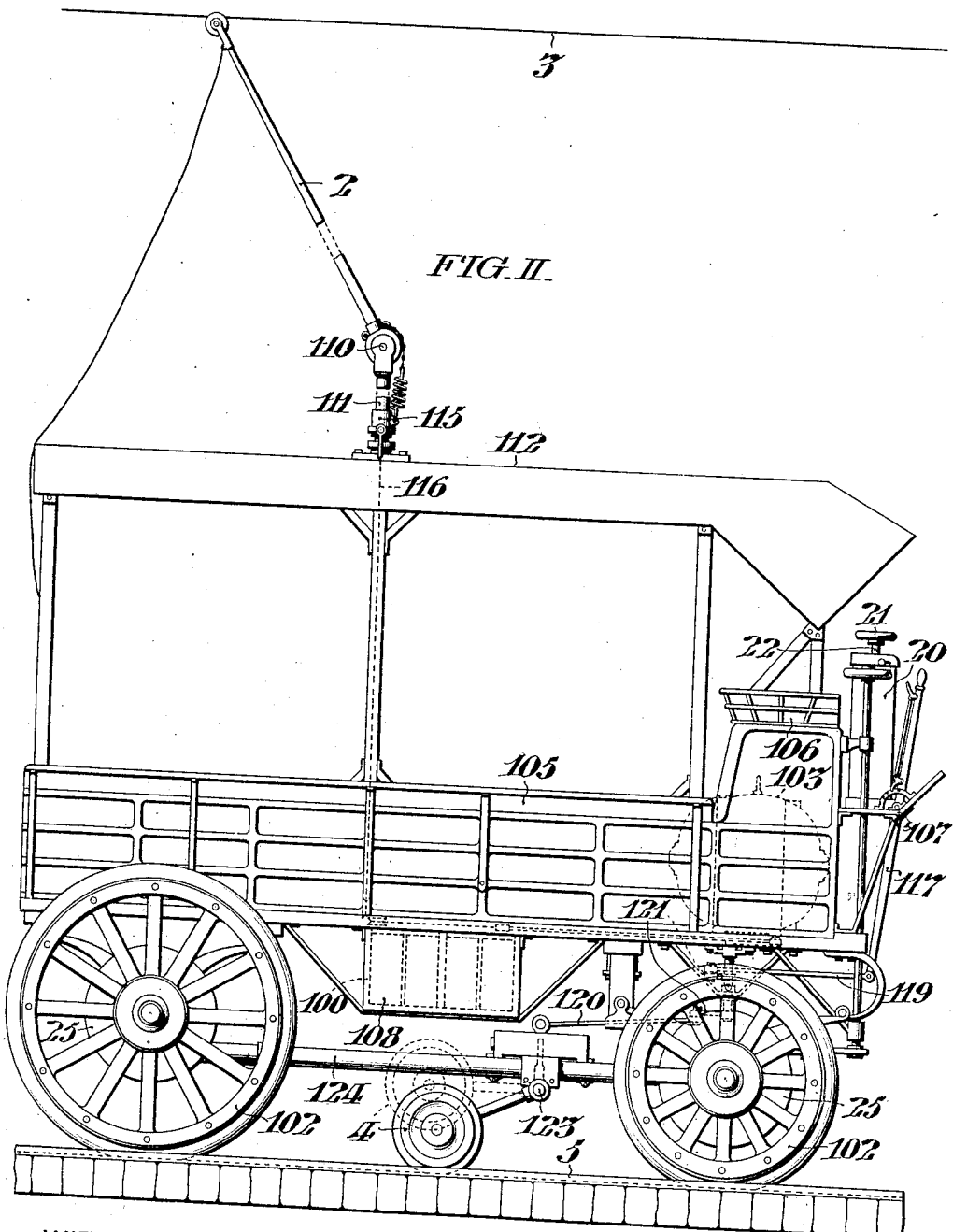
FIG. II.
WITNESSES:
INVENTOR:
MATHIAS PFATISCHER,

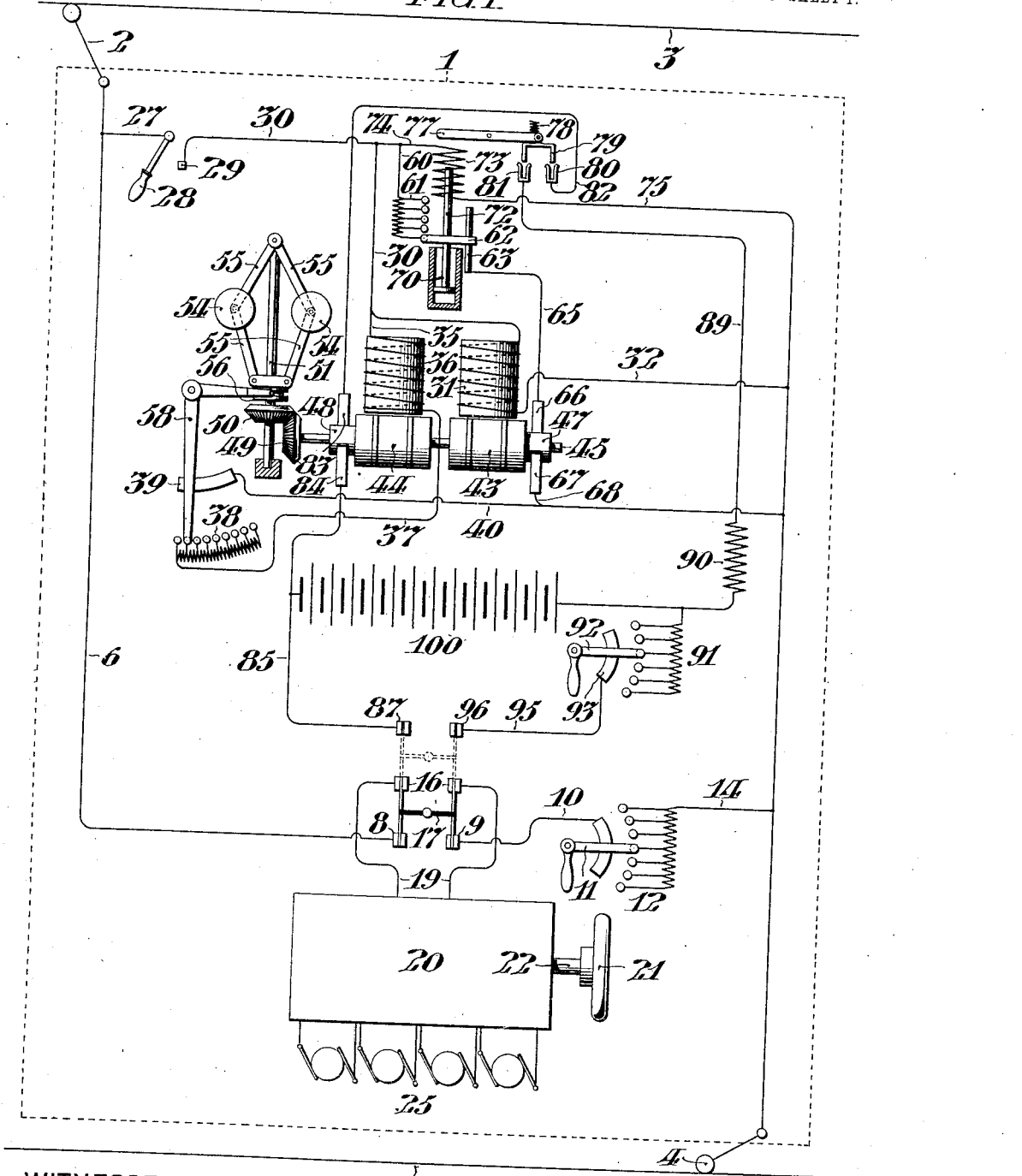

UNITED STATES PATENT OFFICE.

MATHIAS PFATISCHER, OF PHILADELPHIA, PENNSYLVANIA, ASSIGNOR TO RUSSELL THAYER, OF PHILADELPHIA, PENNSYLVANIA.

ELECTRICALLY-PROPELLED VEHICLE.

No. 840,866.    Specification of Letters Patent.    Patented Jan. 8, 1907.

Application filed November 29, 1905. Serial No. 289,557.

*To all whom it may concern:*

Be it known that I, MATHIAS PFATISCHER, of Philadelphia, in the State of Pennsylvania, have invented certain new and useful Improvements in Electrically-Propelled Vehicles, whereof the following is a specification, reference being had to the accompanying drawings.

My improvements are particularly applicable to vehicles of the type described in Letters Patent of the United States No. 764,020, granted to Russell Thayer July 5, 1904. Such a vehicle is provided with electric motors and a storage battery and has wheels constructed and arranged to traverse the tracks of a railway supply system with said motors in operative connection with said system and to traverse a trackless road-bed independently of said system with said motors in operative connection with said battery.

My invention relates particularly to the electrical connection and arrangement of the elements carried by such a vehicle and provides means to permit the contemporaneous charging of a storage battery and operation of a motor by connection with a railway supply system when the current on said system is of such voltage as not to be directly applicable to charge said storage battery. Moreover, my invention enables the vehicle-motors to operate at a constant speed by current derived from a fluctuating supply-circuit.

In the form of my invention hereinafter described a storage battery is connected by a controller with a secondary coil of a transforming device—viz., a motor-generator arranged to take a primary direct current from a railway supply system at five hundred volts and to generate a secondary direct current at one hundred and twenty-five volts to supply a storage battery and four motors, the latter being respectively in operative relation with four driving-wheels of the vehicle. Moreover, the secondary circuit of the motor-generator includes an iron-resistance medium, which by reason of its natural increase in resistance in correspondence with any increase in its temperature automatically checks any tendency of the current to suddenly increase.

The arrangement above contemplated, which is hereinafter more particularly described, has certain characteristics, as follows: First, the speed of rotation of the motor-generator tends to vary in correspondence with variations in the voltage of the supply-circuit; second, the strength of the field of the generator-coil of the motor-generator is increased by an automatic regulator in the same proportion as the speed diminishes, and vice versa. Consequently the net result attained is substantially constant voltage and current in the secondary circuit, provided, of course, the resistance in said circuit remains substantially constant.

My invention comprises the various novel features of construction and arrangement hereinafter more definitely specified.

In the drawings, Figure I diagrammatically indicates the relative arrangement of the elements carried by the vehicle and their relation to the railway supply system; but it is to be understood that it is not intended to show the relative dimensions of said elements. Fig. II is a side elevation of a vehicle of the class contemplated and embodying my improvements.

Referring to Fig. I, the dotted line 1 incloses the elements which are carried by the vehicle, 2 being the pole whereby connection is conveniently made to the overhead wire 3 of the railway supply system, and 4 being a contact-wheel whereby ground connection is made, conveniently with the tracks 5, which support the vehicle, as hereinafter described. The lead 6 extends from the pole 2 to the terminal 8 of the double-pole switch whose opposite terminal 9 is connected by the lead 10 with the lever 11 of the rheostat 12, which latter is connected by the lead 14 with the ground-contact wheel 4. Said lead 6 and the elements connected therewith, as above described, are only utilized when it is desired to operate the vehicle directly from the trolley-circuit without the interposition of the other circuits in the vehicle, and said terminals 8 and 9 are so arranged as to be then operatively connected with the opposed switch-terminals 16 by the switch-lever 17, as shown in full lines in Fig. I. Said terminals 16 are respectively connected by the leads 19 with the controller 20, which comprises the hand-wheel 21, shaft 22, and such other elements in coöperative relation therewith as to enable the operator to connect the four motors 25 in series or parallel relation and to reverse the same. The lead 27 extends from said lead 6 to the manually-operative switch 28, arranged to make or break contact with the terminal 29 of the lead 30, which extends to the motor field-coil 31 of the motor-generator, connected by the lead 32 with the ground contact wheel 4. Said coil 31 is so proportioned and arranged as to maintain an approximately constant field by reason of the saturation of the iron included therein. The lead 35 extends from said lead 30 to the generator field-coil 36 of the motor-generator, which is connected by the lead 37 with the rheostat 38, the terminal 39 of the latter being connected by the lead 40 with the ground-contact wheel 4. The motor-generator-armature coils 43 and 44 are respectively local to said field-coils 31 and 36 and provided with the common shaft 45, which carries the respective commutators 47 and 48 and the beveled gear 49. Said gear 49 is operatively connected with the gear 50 on the governor-shaft 51, which has the opposed weights 54 suspended therefrom by the toggle-levers 55, so as to vary the position of the collar 56 longitudinally on said shaft 51 in accordance with the speed of rotation of the armature-shaft 45. Said collar 56 is in such operative relation with the rheostat-lever 58 as to include more or less of the rheostat-coils 38 in the circuit in correspondence with the changes in the speed of rotation of said armature-shaft 45. The lead 60 extends from said lead 30 to the rheostat-coils 61, which are variably connected by the movable contact member 62 with the rheostat-terminal 63, which is connected by the lead 65 with the brush 66 of the commutator 47, whose opposite brush 67 is connected by the lead 68 with the ground-contact wheel 4. Said variable contact member 62 is carried by the dash-pot plunger 70 and so arranged that when the circuit is broken by the switch-lever 28 all of the rheostat-coils 61 are included in the circuit; but when the circuit is established by said switch 28 exclusion of said coils from the circuit is automatically effected by the coöperation of the solenoid-core 72 and coil 73, the former being operatively connected with said member 62 and the latter being connected with the lead 30 by the lead 74 and with the ground-contact wheel 4 by the lead 75. Said solenoid-core 72 is in such relation to the switch-lever 77 as to tilt the latter against the tension of the spring 78 as said core rises to its upper position under the magnetic stress of the coil 73. Said lever 77 carries the bridge 79, which is arranged to connect the terminals 80 and 81 of the secondary circuit when said lever is tilted, as above described, but which is disconnected therefrom when the switch 28 is open, as indicated. Said terminal 80 is connected by the lead 82 with the brush 83 of the commutator 48, whose opposite brush 84 is connected by the lead 85 with the double-pole switch-terminal 87. Said terminal 81 is connected by the lead 89 through the iron-resistance coil 90 with the rheostat-coils 91, which latter may be variably connected by the lever 92 with the rheostat-terminal 93, connected by the lead 95 with the double-pole-switch terminal 96. As indicated in dotted lines in Fig. I, said double-pole-switch terminals 87 and 96 may be operatively connected with the controller 20 by the double-switch lever 17, when the latter is removed from the position indicated in full lines in Fig. I. It is to be understood that said double-pole switch may be so arranged as to be operated by the controller-shaft 22. The storage battery 100 is bridged across said leads 85 and 89 in connection with said controller 20, so as to be energized contemporaneously with the operation of said motors 25 when the motor-generator is in circuit, during which time the strength of the generator-field 36 of the motor-generator is increased in the same proportion as the speed of rotation of the armature-shaft 45 is diminished, and vice versa, so that substantially constant voltage and current is maintained in the secondary circuit extending to said terminals 87 and 96 and including the controller 20 and storage battery 100. On the other hand, if the controller 20 is retained in the secondary circuit, including said terminals 87 and 96, when the connection with the trolley-supply wire 3 is broken by opening the switch 28 the motors 25 may be operated by current derived solely from said battery 100. Said motors are conveniently designed to operate at approximately one hundred and twenty volts, so that they may be connected in series to be operated directly by connection with the overhead supply-wire 3, carrying a current of approximately five hundred volts; but when the vehicle is to be propelled solely by current from the battery 100 said motors 25 may be arranged in parallel relation therewith and in either case the desired connections may be made by manipulation of the controller 20.

It is to be understood that the permanent iron resistance 90 serves to check sudden increase of current, such as occur, for instance, during the period of starting.

Variation in the number of rheostat-coils 12 included in the circuit (by movement of the lever 11) serves to vary the speed of the vehicle during the operation of the motors 25 in direct connection with the railway supply system, and similarly variation in the number of coils of the rheostat 91 included in the secondary circuit (by movement of the lever 92) serves to vary the speed of the vehicle during the operation of said motors by the battery 100.

Refering to Fig. II, it is to be understood that said four motors 25 may be respectively disposed in operative relation to the four wheels 102 of the vehicle, which, as above noted, are constructed and arranged to traverse the tracks 5 of a railway supply system, with said motors in operative connection with said system and to traverse a trackless roadbed independently of said system with said motors in operative connection with said battery 100. The motor-generator 103, which comprises the coils 31 and 36, &c., above described, may be conveniently carried in the vehicle-body 105 beneath the chauffeur's seat 106 in operative connection with the controller 20, which is supported by the footboard 107, in front of said seat, and the battery 100 may be disposed in the casing 108, beneath said body 105. The pole 2, whereby the apparatus carried by the vehicle is connected with the overhead wire 3, is pivoted at 110 on the standard 111, which is mounted upon the roof 112 of said vehicle. Said pole 2 may be conveniently raised and lowered by corresponding vertical movements of the collar 115 on said standard 111, said collar being operated by the flexible connector 116, extending to the vertical lever 117 at the front of the vehicle, which lever is also operatively connected by the links 119 and 120, rock-lever 121, &c., to raise and lower a pair of ground-contact wheels 4, carried by the shaft 123, suspended from the vehicle-frame 124.

In the position of the apparatus shown in Fig. I the circuits which include the motor-generator 103 and the battery 100 are open and inoperative, and the motors 25 are energized by direct connection with the railway supply system comprising the overhead wire 3 and subjacent track 5, said circuit including the pole 2, lead 6, switch-terminal 8, switch 17, switch-terminal 16, lead 19, controller 20, lead 19, switch-terminal 16, switch 17, switch-terminal 9, lead 10, rheostat-lever 11, rheostat 12, lead 14, and wheel 4 to the track 5. It is to be understood that with the circuits of the vehicle thus arranged the motors 25 being in direct connection with the railway supply system may be energized in series relation with each other by proper manipulation of the controller 20.

If it is desired to operate the motors 25 solely by energy derived from the battery 100, the switch 17 is retained in the dotted position indicated in Fig. I and the switch 28 is swung toward the left-hand side of Fig. I to the position indicated in said figure, in which case all of the circuits above described are rendered open and inoperative except the circuit connecting the battery 100 in series relation with the controller 20, said circuit including a lead 19, switch-terminal 16, switch 17, switch-terminal 87, lead 85, battery 100, rheostat-coils 91, rheostat-lever 92, rheostat-terminal 93, lead 95, and switch-terminal 96, switch 17, switch-terminal 16, lead 19, and controller 20. With the circuits in the vehicle thus arranged the motors 25 may be operated in parallel relation with each other by suitable manipulation of the controller 20. It being desired to retain the vehicle in operative connection with the railway supply system and to contemporaneously charge the storage battery 100, while operating the motors 25, the switch 27 may be retained in the position shown in dotted lines in Fig. I and the switch 28 be swung toward the right-hand side of Fig. I, establishing circuits as follows: Said switch 28 makes direct connection between the lead 27 of said pole 2 and the terminal 29 of the lead 30, with which said motor field-coil 31 and generator field-coil 36 of the motor-generator are connected in parallel relation between the overhead wire 3 and the subjacent track 5, said coil 31 being connected with the contact-wheel 4 through the lead 32 and said coil 36 being connected with said contact-wheel 4 through the lead 37, rheostat-coil 38, rheostat-lever 58, rheostat-terminal 39, lead 40, and lead 75. Contemporaneously the secondary circuit is established from the pole 2, through the lead 27, switch 28, switch-terminal 29, lead 30, lead 60, and the rheostat-coils 61, movable contact member 62, rheostat-terminal 63, lead 65, brush 66, commutator 47, motor-generator-armature coils 43, brush 67, leads 68, 40, and 75, and the contact-wheel 4 to the track 5. Contemporaneously the parallel circuit is established from said lead 30 to the track 5 through the lead 77, solenoid-coil 73, lead 75, and wheel 4, so that the solenoid-core 72 is uplifted, gradually reducing the resistance of the rheostat 61, and finally shifting the switch-lever 77 against the tension of the spring 78 until the bridge 79 establishes connection between the terminals 80 and 81 in the secondary circuit, which includes the lead 82, brush 83, motor-generator-armature coils 44, brush 84, lead 85, switch-terminal 87, switch 17, switch-terminal 16, lead 19, controller 20, lead 19, switch-terminal 16, switch 17, switch-terminal 96, lead 95, rheostat-terminal 93, rheostat-lever 92, rheostat 91, resistance-coil 90, lead 89, switch-terminal 81, bridge 79, and switch-terminal 80. Contemporaneously the battery 100 is also included in the secondary circuit last described in parallel relation with the controller 20, the circuit being established between the leads 85 and 95, through the rheostat-coils 91, lever 92, and terminal 93. With the circuits of the vehicle arranged as last described the battery 100 and the controller 20 are connected in parallel relation with each other in series relation with the motor-generator, and said motors 25 may be operated in series relation, as above described, while said battery is being charged.

I do not desire to limit myself to the precise construction and arrangement herein set forth, as various modifications may be made therein without departing from the essential features of my invention.

I claim—

1. In an automobile provided with wheels constructed and arranged to traverse the tracks of a direct-current railway supply system, and to traverse a trackless road-bed independently of said system; the combination with a storage battery; of a direct-current transformer; a plurality of electric motors respectively in operative relation with said wheels; and, means arranged to operate said motors directly by connection with said battery and indirectly by connection with said railway supply system through said transformer, comprising a controller in parallel relation with said battery in the secondary circuit of said transformer, substantially as set forth.

2. In an automobile provided with wheels constructed and arranged to traverse the tracks of a direct-current railway supply system, and to traverse a trackless road-bed independently of said system; the combination with a storage battery; of a direct-current rotary transformer; a starting-switch comprising an automatically-variable rheostat in the supply-circuit including the primary coil of said transformer; a solenoid in a shunt to ground; a secondary-circuit closer in operative relation with said solenoid; a permanent iron resistance in the secondary circuit, between said circuit-closer and said battery; a governing device arranged to operate in definite relation to the rotation of the armature of said transformer; a rheostat controlled by said governing device and in the secondary circuit of said transformer; a rheostat in the circuit between said battery and said controller; a shunt-circuit from the supply-circuit to ground, in operative relation with said controller; a rheostat in said shunt-circuit; a plurality of electric motors respectively in operative relation with said wheels; and, means arranged to operate said motors directly by connection with said battery and indirectly by connection with said railway supply system through said transformer, comprising a controller in parallel relation with said battery in the secondary circuit of said transformer, substantially as set forth.

3. In a vehicle of the class described, the combination with a storage battery; of a motor arranged to propel the vehicle; a direct-current transformer comprising separate motor and generator field-coils, and armature-coils respectively local to said field-coils; a controller operatively connecting said battery, motor and transformer; and, means arranged to operate said motor directly by connection with said battery, and indirectly by connection with a railway supply system through said transformer, comprising means arranged to connect said generator field-coil directly with said system, substantially as set forth.

4. In a vehicle of the class described, the combination with a storage battery; of a motor arranged to propel the vehicle; a direct-current transformer, comprising separate motor and generator field-coils; and armature-coils respectively local to said field-coils; a controller operatively connecting said battery, motor and transformer; and means arranged to operate said motor directly by connection with said battery, and indirectly by connection with a railway supply system through said transformer, comprising means arranged to connect said motor field-coil directly with said system, substantially as set forth.

5. In a vehicle of the class described, the combination with a storage battery; of a motor arranged to propel the vehicle; a direct-current transformer comprising separate motor and generator field-coils, and armature-coils respectively local to said field-coils; a controller operatively connecting said battery, motor and transformer; and, means arranged to operate said motor directly by connection with said battery, and indirectly by connection with a railway supply system through said transformer, comprising means arranged to connect said motor and generator field-coils of the transformer directly with said system, in parallel relation, substantially as set forth.

6. In a vehicle of the class described, the combination with a storage battery; of a motor arranged to propel the vehicle; a direct-current transformer; and, means operatively connecting said battery, motor and transformer, arranged to operate said motor directly by connection with said battery and indirectly by connection with the railway supply system through said transformer, comprising means arranged to connect a field-coil of the transformer with said railway supply system, substantially as set forth.

7. In a vehicle of the class described, the combination with a storage battery; of a motor arranged to propel the vehicle; a direct-current transformer; means operatively connecting said battery, motor and transformer, arranged to operate said motor directly by connection with said battery and indirectly by connection with the railway supply system through said transformer, comprising means arranged to connect a field-coil of the transformer with said railway supply system; and, means arranged to automatically vary the resistance in circuit with a transformer field-coil of said transformer, in accordance with the speed of rotation of the transformer-armature, substantially as set forth.

8. In a vehicle of the class described, the combination with a storage battery; of a motor arranged to propel the vehicle; a direct-current transformer comprising separate motor and generator field-coils, armature-coils respectively local to said field-coils and an armature-shaft common to said armature-coils; and, means operatively connecting said battery, motor and transformer, arranged to operate said motor directly by connection with said battery, and indirectly by connection with the railway supply system through said transformer, comprising means arranged to maintain said motor field-coil of said transformer saturated, substantially as set forth.

9. In a vehicle of the class described, the combination with a storage battery; of a motor arranged to propel the vehicle; a direct-current transformer comprising separate motor and generator field-coils, and armature-coils respectively local to said field-coils; a controller operatively connecting said battery, motor and transformer; and means arranged to operate said motor directly by connection with said battery and indirectly by connection with the railway supply system, through said transformer, comprising means arranged to automatically vary the resistance in circuit with said generator field-coil, in accordance with the speed of rotation of said armature, substantially as set forth.

10. In a vehicle of the class described, the combination with a storage battery; of a motor arranged to propel the vehicle; a direct-current transformer comprising separate motor and generator field-coils, and armature-coils respectively local to said field-coils; a controller operatively connecting said battery motor and transformer; means arranged to operate said motor directly by connection with said battery and indirectly by connection with the railway supply system through said transformer, comprising means arranged to maintain said motor field-coil of said transformer saturated; and means arranged to automatically vary the resistance in circuit with said generator field-coil, in accordance with the speed of rotation of its armature, supstantially as set forth.

11. In a vehicle of the class described, the combination with a storage battery; of a motor arranged to propel the vehicle; a direct-current transformer; and, means operatively connecting said battery, motor and transformer, arranged to operate said motor directly by connection with a railway supply system, indirectly by connection with said system through said transformer, and independently of said system by connection with said storage battery, substantially as set forth.

12. In a vehicle of the class described, the combination with a storage battery; of a motor arranged to propel the vehicle; a direct-current transformer; and, means arranged to operate said motor directly by connection with said battery and indirectly by connection with a railway supply system through said transformer, comprising means arranged to automatically vary the resistance in a circuit including an armature-coil of said transformer, substantially as set forth.

13. In a vehicle of the class described, the combination with a storage battery; of a motor arranged to propel the vehicle; a direct-current transformer; and, means arranged to operate said motor directly by connection with said battery and indirectly by connection with a railway supply system through said transformer, comprising means arranged to automatically vary the resistance in a circuit including an armature-coil of said transformer, and to automatically close the secondary circuit of said transformer, substantially as set forth.

14. In a vehicle of the class described, the combination with a storage battery; of a motor arranged to propel the vehicle; a direct-current transformer; and, means arranged to operate said motor directly by connection with said battery and indirectly by connection with a railway supply system through said transformer; comprising means arranged to maintain the motor-field of said transformer saturated during the connection of the railway supply system with the vehicle, substantially as set forth.

15. In a vehicle of the class described, the combination with a storage battery; of a motor arranged to propel the vehicle; a direct-current transformer; and, means arranged to operate said motor directly by connection with said battery and indirectly by connection with a railway supply system through said transformer, comprising means arranged to automatically vary the resistance in the generator field-circuit of said transformer in accordance with the speed of rotation of its armature, substantially as set forth.

16. In a vehicle of the class described, the combination with a storage battery; of a motor arranged to propel the vehicle; a direct-current transformer; comprising a motor armature-coil, a generator armature-coil, and field-coils respectively local to said armature-coils; a controller operatively connecting said battery, motor and transformer; and, means arranged to operate said motor directly by connection with said battery and indirectly by connection with the railway supply system through said transformer, comprising a starting-switch including means to gradually diminish the resistance in a circuit including an armature-coil of the transformer, automatically, and, means to close the secondary circuit of said transformer, automatically, substantially as set forth.

17. In a vehicle of the class described, the combination with a storage-battery; of a motor arranged to propel the vehicle; means arranged to connect said motor directly with a railway supply system and with said storage battery; and separate rheostats independently operative to vary the speed of the vehicle when connected with said supply system and with said battery, substantially as set forth.

18. In a vehicle of the class described, the combination with a storage battery; of a motor arranged to propel the vehicle; a direct-current transformer; means arranged to operate said motor directly by connection with said battery and indirectly by connection with a railway supply system through said dynamotor, comprising a controller in parallel relation with said battery in the secondary circuit of said transformer, and, means arranged to maintain the motor-field of said transformer, saturated during the connection of the railway supply system with the vehicle, substantially as set forth.

In testimony whereof I have hereunto signed my name, at Philadelphia, Pennsylvania, this 21st day of November, 1905.

MATHIAS PFATISCHER.

Witnesses:
ANNA F. GETZFREAD,
ARTHUR E. PAIGE.